J. H. KLENCK.
CAMERA SHUTTER.
APPLICATION FILED FEB. 3, 1919.

1,329,715.

Patented Feb. 3, 1920.
5 SHEETS—SHEET 1.

Inventor
J. H. Klenck.

By Lacey & Lacey, Attorneys

J. H. KLENCK.
CAMERA SHUTTER.
APPLICATION FILED FEB. 3, 1919.
1,329,715. Patented Feb. 3, 1920.
5 SHEETS—SHEET 2.
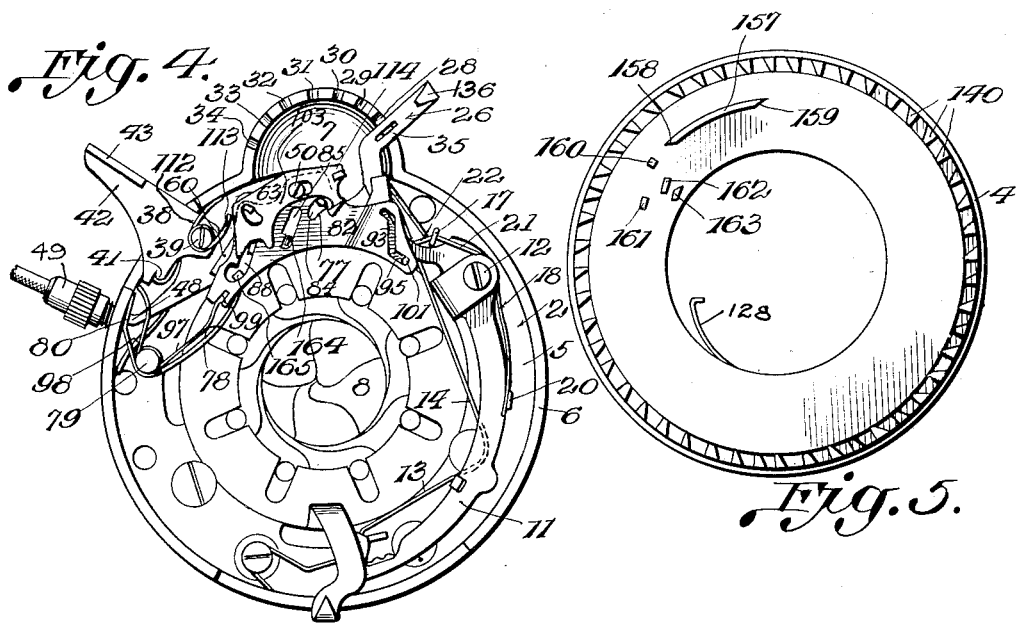
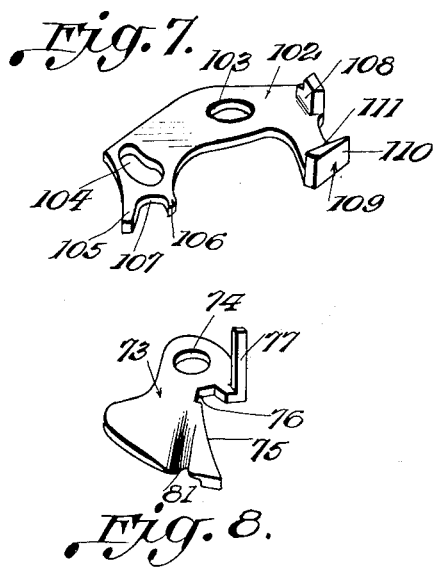
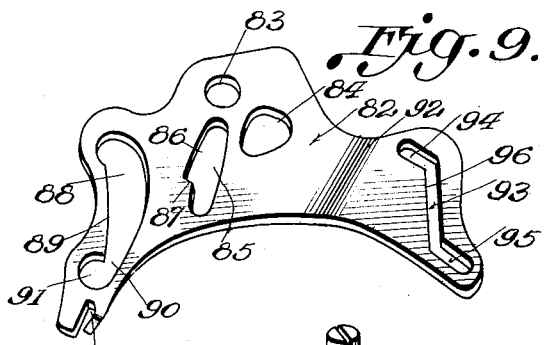
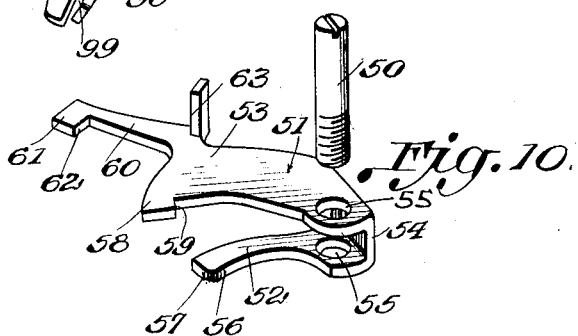
Inventor
J. H. Klenck.
By Loery & Loery, Attorneys J. H. KLENCK.
CAMERA SHUTTER.
APPLICATION FILED FEB. 3, 1919.
1,329,715.
Patented Feb. 3, 1920.
5 SHEETS—SHEET 3.
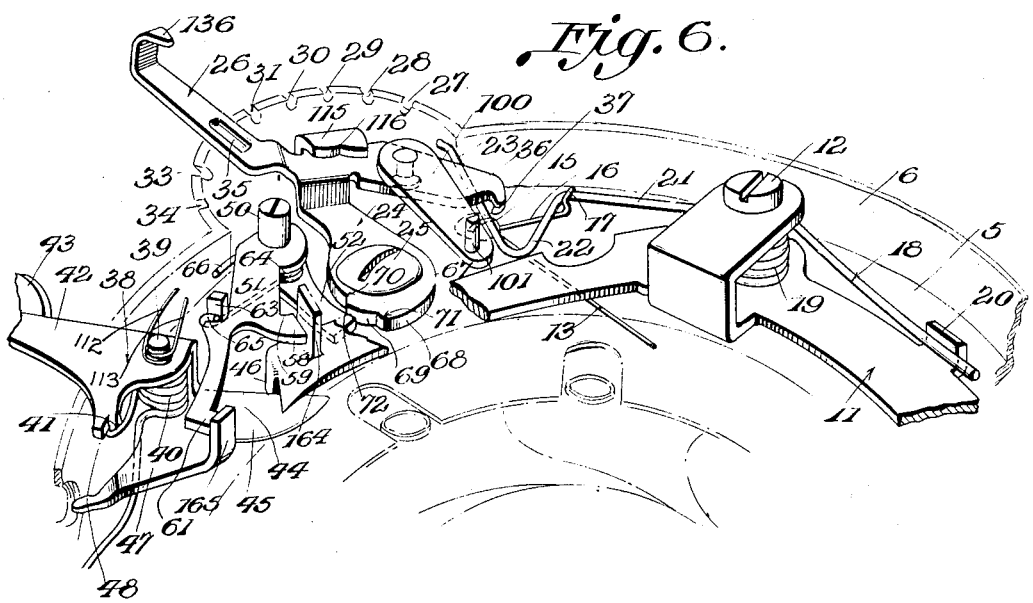
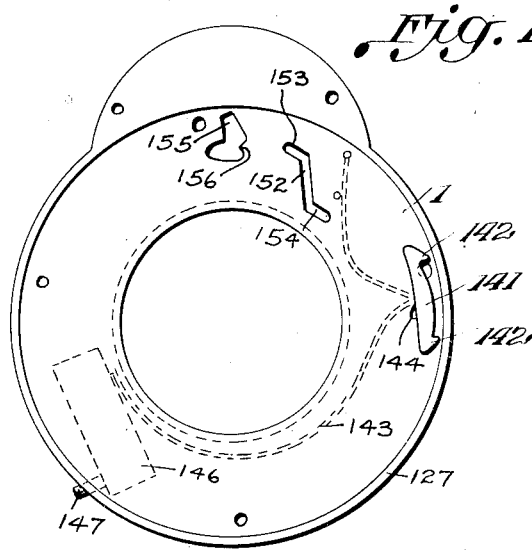
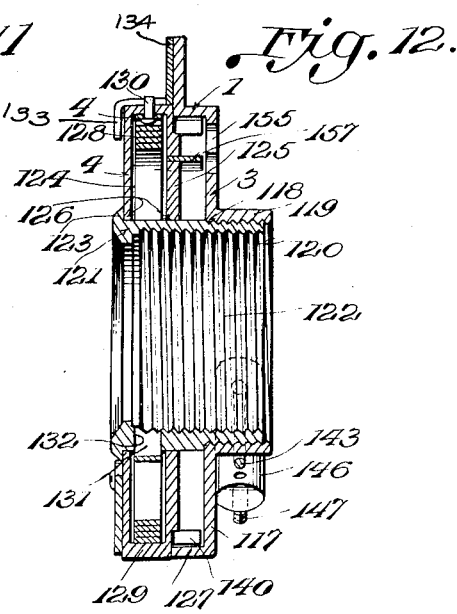
INVENTOR.
J. H. Klenck
BY
Lacey & Lacey,
ATTORNEYS

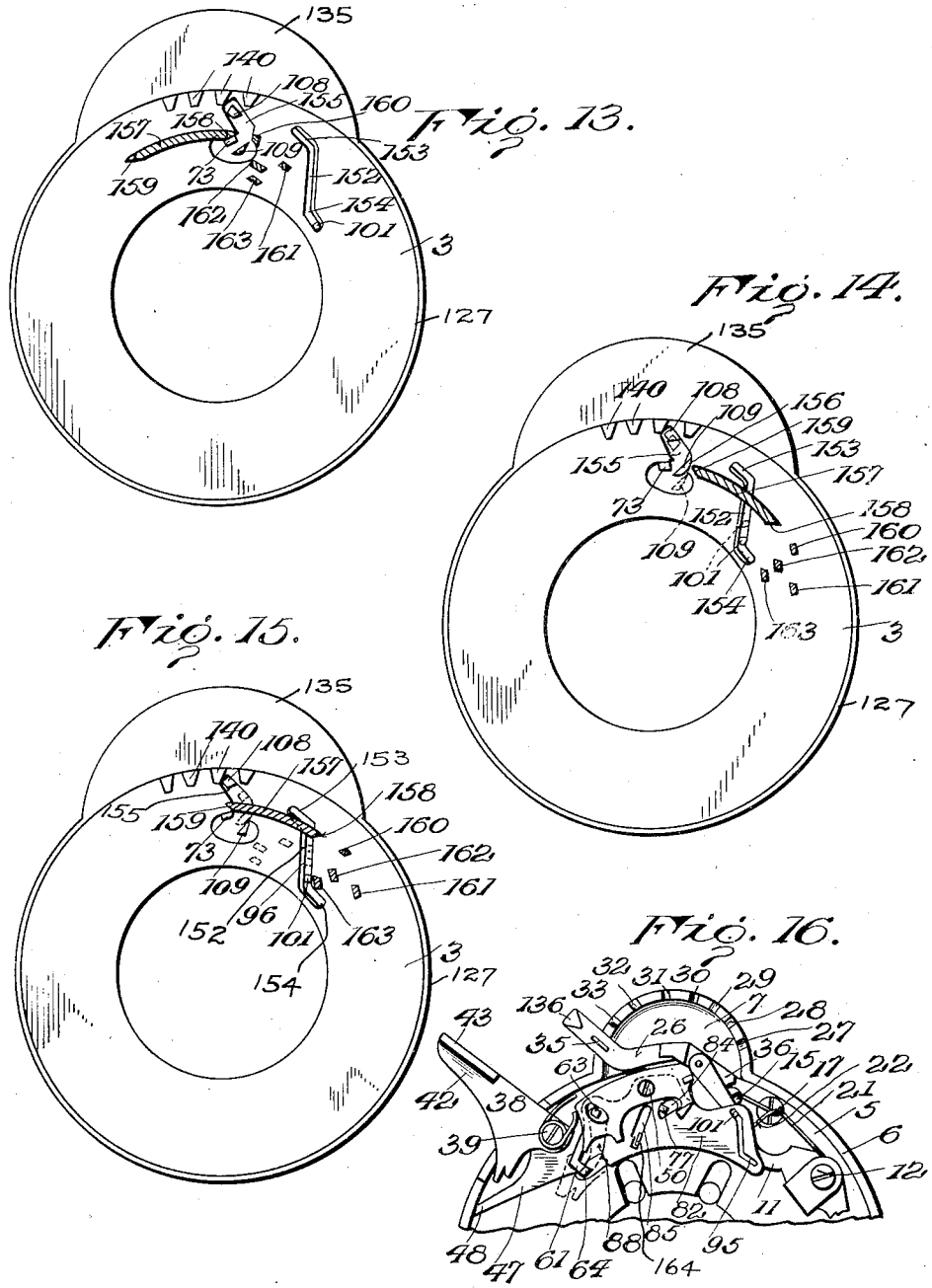

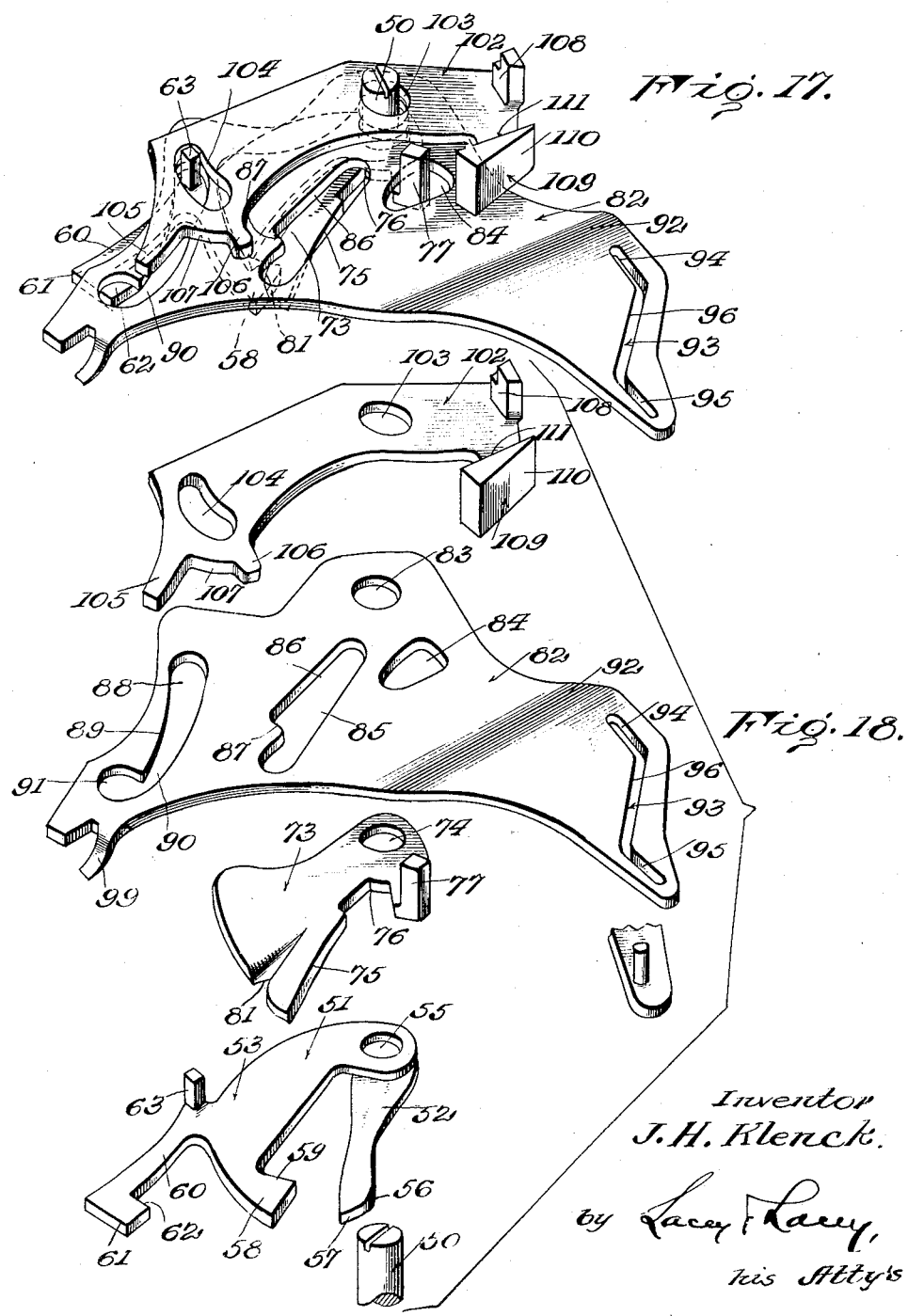

UNITED STATES PATENT OFFICE.

JOHN H. KLENCK, OF WARREN, PENNSYLVANIA.

CAMERA-SHUTTER.

1,329,715.

Specification of Letters Patent.

Patented Feb. 3, 1920.

Application filed February 3, 1919. Serial No. 274,704.

*To all whom it may concern:*

Be it known that I, JOHN H. KLENCK, a citizen of the United States, residing at Warren, in the county of Warren and State of Pennsylvania, have invented certain new and useful Improvements in Camera-Shutters, of which the following is a specification.

This invention relates to improvements in camera shutters. A disadvantage attending the use of a camera equipped with the ordinary shutter lies in the fact that the shutter is required to be operated from a position in the immediate vicinity of the camera so that the person manipulating the camera cannot be included in a group to be photographed unless indeed some ingenious device is resorted to for the attainment of such a result, as for example, a string release trigger device adapted to strike or depress the finger release of the shutter when the string is pulled upon after the party has taken his position in the group. Even though some such crude means be employed to permit of the operator of the camera photographing himself either alone or in a group, the means is not always practicable as it precludes the making of timed exposures; in other words, the shutter mechanism of the camera must be set for an instantaneous exposure. It is true that various attachments have been previously devised for employment and designed to be fixed to some portion of the camera in position where they may act against the finger release lever of the shutter mechanism, but these devices also are impracticable for many reasons. If an attempt is made to use them upon a camera of the folding type, they are found to be so cumbersome as to preclude their attachment to the camera in such a manner as to permit of folding of the camera while they are in place, or they are usually so constructed as to preclude their use with a camera having a tilting or vertically adjustable front. Furthermore, such attachments are ordinarily of considerable weight; they detract from the otherwise neat and compact appearance of the camera; they are adapted solely to coact with the finger release of the camera shutter and can, therefore, be only employed when the shutter is adjusted for instantaneous exposure; and, they are expensive to manufacture. As a consequence the length of the exposure period, in the use of such an attachment, must lie between the limits defining the possible high and low speeds of the shutter when the shutter mechanism is set for instantaneous exposure. Thus, if due to light conditions it is essential that the shutter be open for a longer period of time than the period of greatest length for which the shutter is adapted to remain open when the actuating mechanism for the shutter is set for instantaneous exposure, such an attachment cannot be successfully employed as an under-exposed negative would result from its use. In consideration of the foregoing it is one of the primary objects of the present invention to provide, not an attachment, in the strict sense of the word, for a camera shutter mechanism, but an improved shutter actuating mechanism housed and contained completely within the casing for the shutter and, therefore, inconspicuous, and which mechanism may be set for actuation and released, and will then automatically operate to open the shutter at a later moment, thus permitting the operator of the camera to take his position in front of the camera either by himself or in a group to be photographed.

Another object of the invention is to so construct the shutter actuating mechanism that the same may be set to cause accurate automatic opening of the shutter for any desired predetermined length of time so that the person making use of the camera, having determined before hand the length of exposure required, may set the mechanism and release the same for operation and will be assured that the camera shutter will be open and will remain open the exact required length of time even though the determined period of exposure may be of greater length than the longest possible period provided for through manipulation of the finger release of the shutter mechanism should the shutter be set for instantaneous exposure.

Various types of shutters now upon the market embody various means whereby the length of the exposure period may be increased or diminished when the shutter mechanism is set for what is known as instantaneous exposure, and the speeds range ordinarily from the highest speed to a speed of one twenty-fifth of a second. If, in the use of such a shutter, it is desired to make an exposure of one or two seconds, or even a fifth of a second or a tenth of a second the shutter mechanism must be set for what is known as bulb exposure or time exposure and the operator must depend upon his correct judgment of time in determining when to close the shutter either through actuation of the finger release or the bulb release, and the fact can be readily appreciated that even one highly skilled in such work is liable to incorrectly judge the length of the exposure period. In various automatic shutter actuating mechanisms previously devised, an attempt has been made to overcome this disadvantage by providing means for retarding closing of the shutter through the medium of a dash-pot cylinder and piston, but while it is claimed that such devices are accurate in the performance of their functions, nevertheless it has been found by actual experience that after a relatively short period of use some of them will in their operation be in error as much as two-hundred per cent. It is therefore a further and important object of the present invention to provide camera shutter mechanism which may be set for automatic actuation of the shutter at the highest possible speed, at a low speed of one or several seconds, and at any desired intermediate rate of speed, the mechanism being constructed upon such principles that error is practically impossible.

A further object of the invention is to so construct the mechanism that the shutter front will constitute the setting member of the mechanism, being rotatably mounted and spring actuated in such manner that when rotated in one direction and released, its rotation under the influence of the spring in the opposite direction, will be suitably retarded to allow sufficient time to elapse to permit of the person using the camera taking his position in front of the camera, either alone or in a group, prior to opening of the shutter which is automatically accomplished as the shutter front approaches its normal position. Incidentally the invention has as its object to provide an escapement means for retarding the rotation of the shutter front after it has been released, which means is so constructed and mounted that it will be subjected to minimum strain and wear when the said shutter front is rotated in a direction to set the same, and even should it be very quickly and carelessly turned in setting.

Another object of the invention is to so construct the shutter mechanism that by the manipulation of but a single lever, the mechanism may be adjusted so as to operate at any of the various speeds within the high and low speed limits of the shutter.

The invention has as a further object to so construct the shutter mechanism that when set for an exposure of greater length than the maximum length of exposure when the mechanism is set for instantaneous exposure, the operation of the finger release lever will be positively prevented so that a false exposure cannot be made, such actuation of the said finger release lever being blocked until the shutter front has been properly adjusted.

Another object of the invention is to construct the mechanism so that should the operator set the front and then decide not to make an exposure or to make an exposure of a different length, he may permit the shutter front to return to its normal position without, however, causing operation of the shutter mechanism to effect an exposure.

Another important object of the invention is to provide means whereby, at the will of the operator, the period of time which is to elapse between setting of the shutter front and pressure of the release to release the front for automatic operation to effect an exposure, and the instant at which the exposure is made, may be varied.

In the accompanying drawings:

Fig. 4 is a similar view showing the positions assumed by the parts when the lever is set for an exposure of one one-hundredth of a second;

Fig. 5 is a view in elevation of the shutter front, looking at the inner side thereof;

Fig. 6 is a detail perspective view of a portion of the mechanism, the rear section of the casing in which it is mounted, being shown in light lines;

Fig. 7 is a perspective view of the release-lever blocking-detent of the mechanism;

Fig. 8 is a perspective view of the primary master-lever detent;

Fig. 9 is a perspective view of the secondary master-lever detent;

Fig. 10 is a perspective view of the tertiary master-lever detent;

Fig. 11 is a view in elevation of the fixed member of the forward section of the shutter casing removed, and looking at the forward side thereof;

Fig. 12 is a vertical longitudinal sectional view through the front section of the shutter casing, certain parts being omitted for the sake of clearness;

Fig. 13 is a front elevation of the shutter, the rotatable front of the shutter casing being removed but elements carried by the rear face thereof being shown in section, and the parts being in the positions which they will assume when the setting lever is set for an exposure of one one-hundredth of a second and when the said rotatable front of the shutter casing is in normal position;

Fig. 14 is a view similar to Fig. 13 but illustrating the positions assumed by the parts when the setting lever is set for an exposure of one-half second and the rotatable shutter casing front has been rotated to zero position;

Fig. 15 is a view similar to Fig. 14 illustrating the positions assumed by the parts when the shutter front, in its backward rotation toward the left has slightly passed zero position;

Fig. 16 is a view in elevation of the mechanism, the front of the shutter casing being removed and the parts being shown in the positions which they will assume when the setting lever is set for a timed exposure.

Fig. 17 is a perspective view illustrating various elements of the mechanism in partly assembled relation, parts being broken-away and parts being shown in dotted lines;

Fig. 18 is a group perspective view illustrating the parts shown in Fig. 17 disassembled but occupying substantially the same relative angular positions as shown in Fig. 17.

Figure 1:
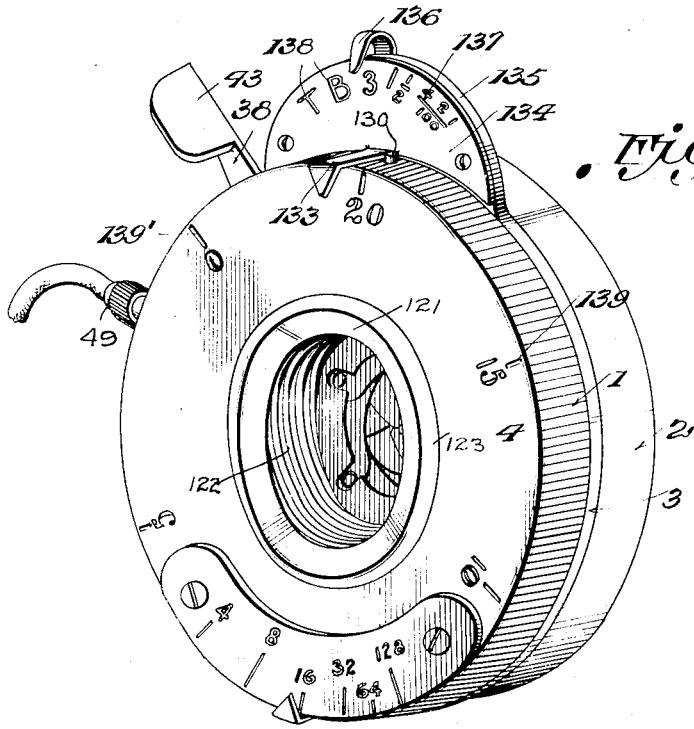
Figure 1 is a perspective view of the shutter mechanism embodying the present invention.
Figure 2:
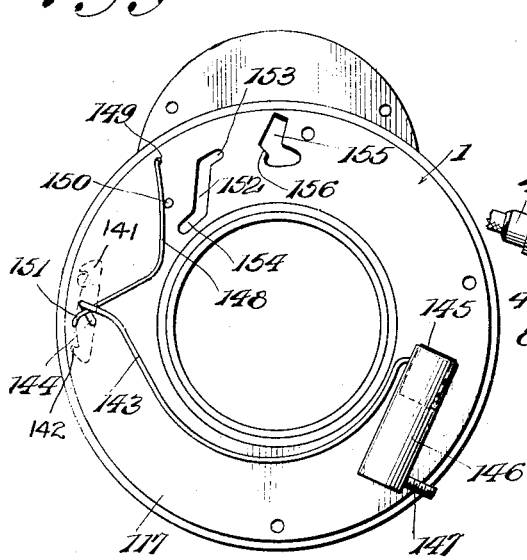
Fig. 2 is a view in elevation looking at the rear side of the front section of the shutter casing.

The shutter actuating mechanism embodying the present invention is mounted in its entirety within a shutter casing which in turn is mounted upon the front of the camera which is to be equipped with the invention, whether the camera be of the box or of the folding type, and as a matter of convenience this casing is formed in two sections, the front section being indicated in general by the numeral 1 and the rear section by the numeral 2. It is, of course, the latter section which is secured to the camera front and this section is therefore rigid. Also, as will be presently explained, it is this section which houses the iris diaphragm, the shutter blades, and the greater portion of the mechanism for actuating these blades. The front section 1 of the casing comprises a fixed member or part indicated by the numeral 3 and a revoluble part indicated in general by the numeral 4. In order to hold the sections 1 and 2 of the casing assembled, screws or the like (not shown) are employed and serve to rigidly connect the said section 2 and the fixed member 3 of the section 1 with the said member closing the open forward side or front of the said section 2 as will be evident from inspection of Fig. 1. The members 3 and 4 of the section 1 are so connected, by a means to be presently described, that the member 4 may be rotated with relation to the member 3, and this member 4 will hereafter be referred to as the rotatable front of the shutter casing.

Figure 3:
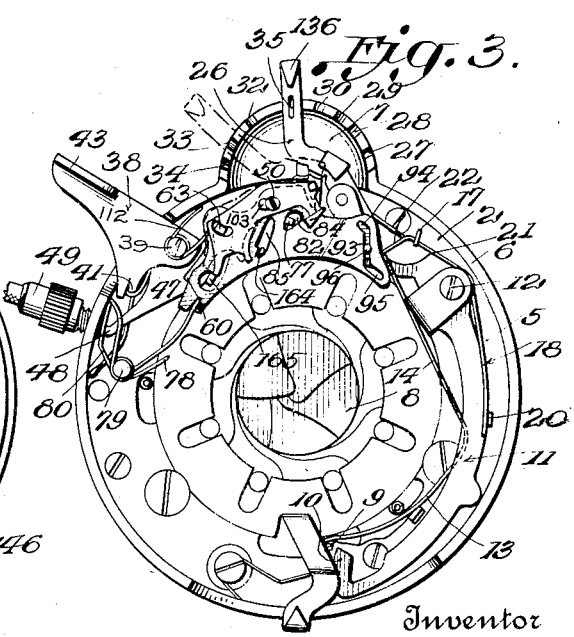
Fig. 3 is a view in front elevation of the rear section of the said casing, the setting lever and the parts affected by its adjustment being shown in full lines in the positions occupied when the said lever is set for an exposure of one second and in dotted lines in the positions occupied when the said lever is set for bulb exposure.

The section 2 of the shutter casing includes a circular rear wall 5 having a forwardly projecting marginal flange 6 which is of annular form except at the upper side of the section 2 where it is extended upwardly to provide an arcuate rack 7 the purpose of which will be presently explained. The shutter blades are indicated by the numeral 8 and these blades are mounted in the usual manner and are to be actuated by the usual blade ring which as it forms no part of the present invention, has not been shown. However, in the drawings the numeral 9 indicates an upstanding finger upon this ring which is to be engaged and tripped by the tripping end 10 of the master lever of the shutter operating mechanism which master lever is indicated in general by the numeral 11. The master lever 11 is mounted upon a pivot 12 within the section 2 of the shutter casing and by reference to Fig. 3 of the drawings and from an understanding of the prior art, it will be evident that when the lever is rocked upon its pivot 12 to swing its end 10 inwardly, its said end will ride over the finger 9 and engage behind the same, and in the return movement of the lever the finger will be retracted and then released so as to enable the blade ring to be moved under the influence of the usual spring 13 associated therewith for this purpose, the retracting of the finger 9 against the tension of the spring serving to move the shutter blades to open position, and the return movement of the ring under the influence of the spring serving to return the blades to closed position. The spring 13 is bowed intermediate its ends as indicated by the numeral 14 with its bow disposed beneath the master lever 11. One end of this spring is connected with the finger 9 and near its opposite end the spring is engaged about a screw or stud 15 upon the inner face of the wall 5 of the casing section 2 near the top thereof, the terminal portion of the spring extending radially from the said screw or stud 15 as indicated by the numeral 16 and bent in the form of a hook as indicated at 17.

In order to return the master lever to its normal position after it has been swung upon its pivot to engage and trip the finger 9 of the blade ring, a spring is employed which is indicated in the drawings in general by the numeral 18. The intermediate portion of this spring is coiled as at 19 about the pivot 12 for the master lever 11 and one branch of the spring engages against a lug 20 upon the said lever in a manner to swing the tripping end of the lever outwardly toward the flange 6 when the spring is tensioned. The other branch of the spring, indicated by the numeral 21, is bent near its extremity to provide a loop 22 and, as will be evident by reference to Figs. 3, 4 and 6 of the drawings, the hooked terminal 17 of the spring 13 is engaged with the spring 21 at the bend where the loop 22 is begun. In forming the loop, one side thereof is extended as indicated by the numeral 23 so as to seat and bear against the inner surface of the extension 7 of the flange 6. Thus at all times the spring 18 will be under tension. As before stated, the spring 13 is engaged, near one end, about the screw or stud 15 and this engagement is a pivotal one for which reason it will be evident that in engaging the hooked terminal 17 of the portion 16 of the spring with the bend in the spring 21, the said spring 13 is placed under tension throughout its length, and any movement of the finger 9 of the blade ring toward the right in Fig. 3 for example, must be against the tension of the said spring 13, and likewise when the finger is released or tripped, it, together with the blade ring by which it is carried, will be returned toward the left to normal position with a greater or less degree of force depending upon the tension under which the spring 13 is placed. Likewise it will be evident that the master-lever 11 is moved under the influence of the spring 18 at a speed in ratio to the tension of the said spring so that if the spring is highly tensioned, the speed of movement of the lever will be proportionately high. It will now be apparent that the speed of the shutter is determined by the tension of the springs 13 and 18, and in order that this tension may be varied at the will of the operator of the camera so as to regulate the shutter speed, and also in order that other results to be hereinafter described may be attained, means is provided which will now be described.

The means just referred to are embodied in whole or in part in the setting lever of the mechanism and this lever is indicated in general by the numeral 24 and is pivotally mounted, preferably by means of a pivot screw 25, upon the wall 5 of the casing section 2. From what has been said before it will be remembered that the adjustment of this lever provides for the making of exposures of various lengths of time, and in order that the said lever may be manually adjusted, it is provided with an arm 26 which extends beyond the flange 6 of the casing section 2 and consequently exteriorly of the said casing. In order to hold this lever in its various positions of adjustment, the extension 7 is formed in its edge with a number of notches which are indicated by the numerals 27, 28, 29, 30, 31, 32, 33 and 34, and the arm 26 is struck down to provide a rounded tooth portion 35 designed to successively engage in the notches when the lever is swung upon its pivot in either direction. An arm 36 extends laterally from the intermediate portion of the lever within the casing section 2 and in the general direction of the loop 22 in the spring 18, and this arm is provided at its end with a depending lug 37 in the path of movement of which the bight of the loop 22 is located. When the lever 24 is in any position of adjustment where its tooth 35 will engage in any one of the notches other than one of the notches 27, 28 or 29, the lug 37 will be out of engagement with the bight of the loop 22 of the spring 18 and therefore the said spring and likewise the spring 13 will be under a normal tension such as results from the engagement of the terminal portion 23 of the spring 18 against the inner side of the extension 7, and the hooked engagement of the upper terminal of the spring 13 with the portion 21 of the spring 18. As the lever 24 is swung to such position that its tooth 35 will pass from the notch 30 into the notch 29 the lug 37 will be brought into engagement with the bight of the loop 22 and this end or arm of the spring 18 will be moved inwardly a short distance, and as the coils 19 pivotally fit the screw 12, the tension of the spring will be slightly increased. Also inasmuch as in this inward movement of the arm 21 of the spring 18, the arm 16 of the spring 13 is also moved inwardly, this latter spring will likewise have its tension slightly increased. As will be presently made apparent, when the lever 24 is caused to assume this position, the mechanism will be set for an exposure of one twenty-fifth of a second. When the lever is further swung so that its tooth 35 will pass from the notch 29 into the notch 28, the arm 21 of the spring 18 will be moved inwardly a farther distance as will also the arm 16 of the spring 13, and these two springs will be placed under a still higher degree of tension, and when the lever is caused to assume this position the mechaanism is set for an exposure of one fiftieth of a second. For an exposure of one-hundredth of a second, the setting lever is moved a farther distance so that its tooth 35 will pass from the notch 28 to the notch 27 and in such movement of the said lever the springs 18 and 13 will be placed under a maximum degree of tension. As has been previously explained, when the said springs are placed under increasing degrees of tension, the speed of movement of the master-lever 11 and the blade ring of the shutter will be proportionately increased. Of course, in movement of the lever 24 in the opposite direction so that its tooth 35 passes successively the notches 27, 28 and 29, the springs will be gradually relieved of the increased tension to which they have been subjected and when the lever has reached the position of the notch 30 the lug 37 will have moved out of engagement with the bight of the loop 22.

As in the ordinary types of shutter operating mechanisms, the mechanism of the present invention embodies a finger release lever adapted to be manually actuated so as to in turn actuate the master lever 11, and this finger release lever is indicated in general by the numeral 38 and is pivotally mounted upon a pin 39 the outer end of which pin projects beyond the outer side of the said lever. A spring 40 is coiled about the pin 39 and is engaged at one end with a finger 41 upon the said lever and at its other end bears against the flange 6 of the casing section 2, the spring yieldably holding the lever 38 swung upwardly as is usual. The lever includes an arm 42 which extends through a slot in the flange 6 and is provided with a finger piece 43 whereby it may be readily manually depressed. Within the casing section 2, the lever is provided with a radially extending finger 44 having a beveled lower side or edge 45 and this finger is designed for coöperation with a rearwardly projecting lug 46 located at the extremity of the upper arm of the master lever 11 and at all times in the path of movement of the finger 44 in the swinging movement of the finger release 38. It will be understood that when the finger release lever 38 is depressed and thus swung upon the pivot 39, its finger riding against the lug 46 will cause the master lever 11 to swing upon its pivot until the tripping end 10 has engaged behind the finger 9 and as the said finger 44 rides past the lug 46, the master lever will, of course, be released for actuation by its controlling spring 18. Of course, in the return movement of the finger release lever 38 under the influence of its spring 40, the beveled side of the finger 44 will ride beneath the lug 46 so that the finger will resume its normal position which is shown in Fig. 6 of the drawings. The finger release lever 38 is further provided with an arm 47 having a terminal finger 48 lying opposite an opening in the flange 6 into which is fitted one end of the usual bulb tube 49 so that the lever may be actuated by the said bulb in making bulb exposures.

The shutter actuating mechanism of the present invention embodies primary, secondary and tertiary master-lever detents and for the sake of convenience I will first specifically describe the characteristic features of these several detents and their relative disposition and will then explain their several functions.

The detents above mentioned are all pivotally mounted upon a pivot post 50 threaded or otherwise secured in the wall 5 of the casing section 2 and located to one side of and above the pivot screw 25 for the setting lever 24. The tertiary master-lever detent occupies the innermost position upon this pivot post and this detent is most clearly shown in Figs. 6 and 10 of the drawings and is indicated in general by the numeral 51. The said detent comprises arms 52 and 53 connected at their inner ends by a bridge portion 54 and the said arms are formed near the bridge with alined openings 55 to adapt the said detent to pivotally fit the said post 50. The arm 52 has one of its edges, indicated by the numeral 56, curved inwardly upon a suitable arc, and the extremity of the arm at this edge is slightly rounded as indicated by the numeral 57. The edge 56 is presented toward the pivoted end of the setting lever 24, and the corresponding edge of the arm 53 of the detent 51 is formed between its ends with a laterally projecting lug 58 providing a shoulder indicated by the numeral 59. This arm of the detent is extended to provide a finger 60 which terminates in a lug 61 projecting in the same general direction as the lug 58 and providing a shoulder 62. Substantially at the junction of the inner end of the finger 60 with the outer end of the arm 53, the said arm is formed with an outstanding or forwardly projecting lug indicated by the numeral 63. A spring 64 is coiled at its intermediate portion about the pivot post 50 and has one end turned to engage over the edge of the finger 60 at the base of the lug 63 as indicated by the numeral 65, the other end of the spring indicated by the numeral 66, bearing against the inner side of the flange 6 of the casing section 2. It will be evident that this spring tends to swing the detent in the direction of the pivoted end of the setting lever 24 or, in other words, toward the right when the mechanism is viewed from the front as in Figs. 3 and 4 of the drawings. This movement of the detent is limited, however, by the engagement of its arm 52 against the pivoted end of the setting lever 24. This end of the lever, as clearly shown in Fig. 6 of the drawings, is enlarged to provide a head 67 the periphery of which is formed with relatively stepped cam portions 68, 69 and 70 located in the order named more remote from the pivot 25. The curvature of the edge 56 of the arm 52 of the detent 51 conforms generally to the curvatures of the several cam surfaces just referred to, and of these surfaces, the ones indicated by the numerals 68 and 69 are merged by a rounded nose 71, and the ones indicated by the numerals 69 and 70 are merged by a rounding nose 72, these noses being by reason of their rounded nature, adapted to ride past the rounded corner 57 of the said arm 52 when the setting lever 24 is swung about its pivot. It will now be evident that the edge 56 of the arm 52 of the tertiary detent may rest against the cam surface 68, against the cam surface 69, or against the cam surface 70, and will engage one or another of these surfaces depending upon the position to which the setting lever is adjusted. Thus it will be apparent that when the arm 52 is in engagement with the cam portion 68, the detent 51 will be at the limit of its inward swinging movement, when the said arm 52 is in engagement with the cam portion 69 the said detent will be at an intermediate point in its swinging movement, and, when the said arm 52 is in engagement with the cam portion 70, the detent will be at the limit of its outward swinging movement. It will also be evident that angular adjustment of the setting lever 24 will serve to swingingly or angularly adjust the detent 51 about its pivot, and the purpose of these adjustments will be presently set forth.

The primary master-lever detent heretofore referred to is clearly shown in Fig. 8 of the drawings and indicated in general by the numeral 73 and the same comprises a flat body formed with an opening 74 to adapt it to be pivotally fitted to the post 50, the detent occupying a position immediately in front of the tertiary master-lever detent above described and in fact resting against the forward face of the arm 53 of the last-mentioned detent. The detent 73 is formed upon one of its edges, indicated by the numeral 75, with a shoulder indicated by the numeral 76; and to the right of this shoulder the body of the detent is provided upon its forward face with a lug 77. A spring 78 is coiled at its intermediate portion about a post or pin 79 upon the wall 5 of the casing section 2 and this spring bears at one end 80 against the flange 6 and at its other end is engaged in a notch 81 formed in the lower edge of the body of the detent 73. The tendency of this spring is to swing the detent upon its pivot toward the right, and such movement of the detent is limited in a manner to be presently explained.

The secondary master-lever detent is clearly shown in Fig. 9 of the drawings and is indicated in general by the numeral 82 and this detent is formed with an opening 83 adapting it to pivotally fit the pivot pin 50, the said detent 82 being positioned immediately in advance of the detent 73 and resting at its rear face against the forward face of the said detent 73. The detent 82 is formed with an opening 84 to accommodate the lug 77 upon the detent 73, and the said detent 82 is further formed with an elongated opening 85 one wall 86 of which is provided with a shoulder 87. The detent 82 has its body also formed with an elongated opening 88 located to the left of the opening 85 and having one of its walls indicated by the numeral 89, so positioned as to constitute a cam surface under conditions to be presently explained, the opening 88 being relatively restricted at the lower end of this cam portion 89 as indicated by the numeral 90 but being widened below its restricted portion as indicated by the numeral 91. As will be observed by reference to Fig. 9, the opening 85 is so located that its long dimension will extend approximately radial to the opening 83 and at an angle of inclination closely approaching the vertical. Near its right hand end the body of the detent 82 is offset in a forward direction as indicated by the numeral 92, and this end of the body is formed with a slot 93 the intermediate portion of which extends approximately vertically and the upper and lower ends of which are extended respectively upwardly and downwardly and at an angle to the intermediate portion and toward the left and right so as to form branches 94 and 95. One wall of this slot 93 is indicated by the numeral 96 and will be presently more specifically referred to. A spring 97 is coiled at its intermediate portion about the post 79 and bears at one end 98 against the flange 6 and at its other end engages in a notch 99 formed in the lower edge of the body of the detent 82 near the lower end of the opening 88, and this spring tends to swing the detent 82 toward the right in Fig. 4.

When the detents 51, 73 and 82 are assembled upon the pivot post 50, they will be so relatively located that the edge of the arm 53 which is provided with the shoulder 59, the edge 75 of the detent 73 which is provided with the shoulder 76, and the opening 85 of the detent 82, will occupy approximately corresponding positions and the purpose of this arrangement will presently be made clear. Also the edge of the finger 60 of the detent 53 which is formed with the shoulder 62, and the opening 88 in the detent 82 will occupy approximately corresponding positions.

The arm 36 of the setting lever 24 has pivotally connected with it, one end of a link 100, and at its free end this link is provided with a forwardly projecting stud 101 which projects into the slot and works in the said slot 93 and its branches 94 and 95 when the said lever 24 is angularly adjusted about its pivot.

Fig. 7 of the drawings clearly illustrates the release-lever blocking-detent of the mechanism and the said detent is indicated in general by the numeral 102 and is formed with an opening 103 approximately elliptical in form and of a width equal substantially to the diameter of the pivot pin 50 and of a length slightly greater than said diameter so that the said detent 102 may not only have pivotal movement upon the pin or post 50 but may also have shifting movement bodily with relation to said pin. The detent when fitted to the pin or post 50 occupies a position resting against the forward face of the detent 82, and the said detent 102 is formed near its left hand end with an approximately elliptical opening 104 occupying a position corresponding substantially to the position occupied by the upper end of the opening 88 in the said detent 82. Also at its said end and at its lower edge the detent 102 is provided with a downwardly extending blocking finger 105 and with a finger 106 located to the right of the finger 105 and suitably spaced therefrom. The said portion of the said lower edge of the detent 102 between the fingers 105 and 106 constitutes a cam surface indicated by the numeral 107. When the detents heretofore referred to are properly assembled upon the pivot pin 50 the lug 63 will project through the upper end of the opening 88 in the detent 82 and through the opening 104 in the blocking detent 102. The detent 102 at that end opposite its end which is formed with the blocking finger 105, is provided upon its forward face with a forwardly projecting dog indicated by the numeral 108, and below the dog with a forwardly projecting lug 109 having a beveled under side 110 and a beveled upper side 111, and in the assembled positions of the parts, the lug 77 will project through the opening 84 in the detent 82, and the lug 109 upon the face of the blocking detent 102 will be located to the right of and relatively close to the end of the said stud 77. A spring 112 is coiled at its intermediate portion about the pivot post 39 for the finger release-lever and bears at one end against the flange 6 and at its other end as at 113 against the left hand end of the blocking detent 102 thus tending to swing the detent upon its pivot 50 toward the right in Fig. 4 and also to hold the said blocking detent bodily shifted toward the right with relation to the pin 50. For a purpose to be presently pointed out the upper right hand corner of the blocking detent 102 is rounded as indicated by the numeral 114, and for coaction with this rounded corner or shoulder, the setting lever 24 is provided with a lip 115 having a cam edge 116 designed to move in the path of the corner or shoulder 114 in the adjustment of the said lever 24 as will be presently pointed out.

As heretofore stated the fixed member 3 of the section 1 of the shutter casing is rigidly secured to the section 2 in position closing the open front of the said section, and this member 3 comprises a circular body 117 having an opening 118 formed therein and surrounded by a short tubular extension 119 upon the rear face of the said body 117 and interiorly threaded as indicated by the numeral 120. The lens tube of the shutter casing is indicated by the numeral 121 and the same is exteriorly threaded at one end to fit within the said extension 119 as clearly shown in Fig. 12 of the drawings, this lens tube being also interiorly threaded as indicated by the numeral 122 to receive the usual lens, (not shown). The tube 121 at its forward end is formed exteriorly with a circumscribing flange 123, and the rotatable member 4 of the forward section of the shutter casing has its front and rear walls, indicated respectively by the numerals 124 and 125, formed with alined openings 126 to adapt the said member 4 to be rotatably fitted onto the forward portion of the lens tube 121, the peripheral portion of the rear face of the wall 125 of the member 4 seating against the edge of an annular marginal flange 127 formed upon the forward face of the body 117 and being held in this position by the engagement of the flange 123 against the forward face of the wall 124 of the said member 4. In this manner the said member 4 is rotatably supported upon the lens tube in advance of the member 3. The member 4 is hollow and housed within the same is a coil spring 128 one end of which is secured to the circumferential wall 129 of the member 4 as, for example, by a stud or rivet 130, one end of which projects beyond the said peripheral wall or rim of the said member 4 as clearly shown in Figs. 1 and 12 of the drawings. The other end of the spring 128 is hooked and engaged as at 131 in a notch or opening 132 formed in the wall of the lens tube 121. It will now be understood that when the shutter front comprising the member 4 is rotated in one direction, the spring 128 will be wound or placed under tension and when the said front is released, this spring will then act to rotate the front in the opposite direction thus returning it to its normal position. When the shutter front is returned to normal position, or when in normal position, its backward rotation under the influence of the spring 128 is arrested by the engagement of the projecting outer end of the stud 130 against one side of an indicator finger 133 which projects forwardly from the lower edge of a scale plate 134 which is mounted upon the face of an upward extension 135 upon the flange 127 of the member 3. This scale plate 134 bears upon its face letters and numerals indicative of various exposure periods or conditions, and the arm 26 of the setting lever 24 is provided at its upper end with an indicating finger or pointer 136 designed to be brought into registration with the various scale indications upon the said plate 134, in the adjustment of the said setting lever. Thus the face of the scale plate bears numerals and fractions, as indicated by the numeral 137, denoting exposures of one-hundredth, one-fiftieth, one-twenty-fifth and one-half of one second, one second, and three seconds, and also, as indicated by the numeral 138, the letters B and T denoting, respectively, bulb and time exposures. Likewise the forward face of the wall 124 of the member 4 bears an annular series of scale marks 139 which may be brought selectively into registration with the pointer or finger 133 when the shutter front is rotated and these scale marks are suitably designated to indicate the number of seconds which will elapse between release of the shutter front for rotation under the influence of the spring 128 when any particular one of the scale marks is in registration with the indicator finger 133, and the period of actual opening of the shutter. One of these scale marks is indicated specifically by the numeral 139' and constitutes the zero mark of the scale 139 and serves a purpose to be presently set forth.

In order to retard and time the backward rotation of the shutter front under the influence of the spring 128, an escapement means is provided which will now be described. The rear face of the wall 125 of the member 4 is formed with an annular series of ratchet teeth, indicated by the numeral 140. An escapement pawl 141 having spaced teeth 142 for coöperation with the ratchet teeth 140, is fixed upon one end of a bowed wire arm 143 which end of the arm is loosely fitted through an opening 144 formed in the body 117 of the member 3, the bowed portion of the arm extending around the under side of the lens tube 121 and being fixed at its opposite end to a piston 145 working in a dash-pot cylinder 146, the admission of air to and the escape of air from this cylinder being controlled by a small valve 147 located near the closed end of the cylinder. A wire spring 148 is secured at one end in an opening 149 in the said body 117 and this spring bears against a pin 150 upon the face of the said body and engages at its free end as at 151 in the bend in the first mentioned end of the arm 143, the intermediate portion of this spring being bowed. The spring 148, of course, by reason of its engagement in the bend of the arm 143 serves to yieldably hold the escapement pawl 141 with both of its teeth 142 in engagement with the ratchet teeth 140. However, as stated above, the said end of the arm 143 fits loosely in the opening 144 and may therefore have play in this opening and as a consequence when the shutter front is rotated in one direction, or more specifically toward the right when viewed from the front, and in the act of setting the said shutter front, the beveled sides of the ratchet teeth 140 will ride over the teeth of the escapement pawl 141, thus shifting the escapement pawl bodily away from the ratchet, and in this manner the ratchet teeth may pass the escapement pawl without any reciprocatory motion being imparted to the piston or plunger 145 through the arm 143. While the said end of the arm 143 has play in the opening 144, nevertheless it is in a sense pivoted in the said opening so that when the shutter front is released and is backwardly rotated through the influence of the spring 128, oscillatory motion will be imparted to the said arm 143 as its said end is fixed to the escapement pawl. Such motion of the arm 143 is, however, retarded by the dash-pot device comprising the piston 145 and cylinder 146, and therefore the backward rotation of the shutter front will be correspondingly retarded and timed.

The body 117 of the member 3 is formed with a slot 152 having branches 153 and 154, this slot corresponding in general shape and location, when the parts are assembled, to the slot 93, and the branches 153 and 154 corresponding to the branches 94 and 95 of the said slot 93 in the detent 82.

The body 117 is also formed with an opening 155 to accommodate the dog 108 and the lugs 109 and 77, one wall of the said opening being formed with a shoulder 156 the function of which will be presently explained.

Upon the rear face of its wall 25, the rotatable shutter front 4 is provided with an arcuate tripping rib 157 having beveled ends 158 and 159, and the said face of the said wall is further provided with tripping lugs indicated one by the numeral 160, another by the numeral 161, a third by the numeral 162, and a fourth by the numeral 163. These lugs in the order named are located nearer the center or axis of the rotatable front and the lugs and the said rib 157 occupy the relative positions shown in Fig. 5 of the drawings, the lug 160 being located in the same arc as the rib 157 and suitably spaced from the beveled end 158 thereof, and the other lugs 161, 162 and 163 being arranged as shown. The said rib 157, and the said tripping lugs are designed, in the rotation of the shutter front, to coact with the lugs 77 and 109 and with the stud 101 upon the link 100 of the setting lever 24 under conditions which will be pointed out in the description of the operation of the mechanism.

Before proceeding to a description of the operation of the mechanism attention is called to the fact that the end 158 of the tripping rib 157 is located substantially radially opposite the stud 130 and that the lug 77 is located substantially in the same line, when the shutter front is in normal position.

Figs. 13, 14 and 15 illustrate clearly the general relative positions of the tripping rib, tripping lugs, lugs 77 and 109, and the stud 101, these figures being intended to represent certain movements and changes in the positions of the parts which occur when the shutter front is being rotated.

To provide for coaction of the several master-lever detents with the master-lever to control the same in its return movement to normal position in the operation of the shutter mechanism, the said lever is formed near its end at which the lug 46 is located, with an outstanding lug 164. Also for a purpose to be presently explained, the finger release-lever 38 is provided upon its arm 47 with an outstanding lug 165 which projects into and works in the opening 88 in the detent 82.

Having now described the characteristic features of the several component parts of the mechanism of the present invention and the general relation which these parts bear to one another, I will proceed to a description of the operation of the mechanism under various exposure-period conditions.

If it is desired to make an exposure of one one-hundredth of a second, the setting lever 24 is swung to such position that its tooth 35 will seat in the notch 27, the indicator finger 136 at such time pointing to the proper fraction upon the scale plate 134. Except for the finger release lever 38, the parts will then assume the positions shown in Fig. 4 of the drawings. As heretofore stated in such movement of the setting lever, the lug 37 will engage the bight of the loop 22 in the spring 18, and when the lever has been moved to the stated position, this spring as well as the spring 13 will have been placed under the maximum degree of tension. As the setting lever is thus swung, the cam portion 70 of the said lever will be brought into position engaging the edge 56 of the arm 52 of the tertiary master-lever detent and this detent will be swung toward the left so that the lug 63, by engaging the upper ends of the openings 88 and 104, will carry or swing the secondary master-lever detent 82 and the blocking detent 102 toward the left and to the position shown in Fig. 4. In this position of the parts the shoulder 59 of the detent 51 and the shoulder 87 of the detent 82 will be out of the path of movement of the lug 164, which lug projects into the opening 85 in the said detent member 82. Likewise in this position of the parts, the blocking finger 105 of the blocking detent 102 will be out of the path of movement of the lug 165 upon the release lever 38. With the blocking finger 105 out of the path of movement of the lug 165, the movement of the finger release-lever 38 will not be blocked. In the meantime the rotatable shutter front is presumed to be in normal position, in which position, as before stated; the stud 130 rests against one edge of the indicator finger 133. With the rotatable shutter front in this position, the rib 157 at its end 158 will engage over the lug 77 of the primary detent 73 so that the shoulder 76 of this detent will be clear of the path of movement of the lug 164. If the exposure is to be effected manually, it is now only necessary to press downwardly upon the finger release lever 38 whereupon the arm 44 of this lever, in swinging upwardly, will coact with the lug 46 on the upper end of the master-lever 17 and will carry this lever upwardly until the end of the arm 44 passes the said lug, whereupon the master-lever will be tripped and immediately returned to its normal position through the spring 18, thus tripping the blade ring of the shutter to open and close the shutter to effect an exposure of one one-hundredth of a second. In this operation of the parts, it will be noted that the arresting shoulders of the primary secondary and tertiary master-lever detents are clear of the path of movement of the lug 164 and consequently the return of the master-lever to its normal position under the influence of the spring 18, will not be arrested. In the same manner, the mechanism may be set, through adjustment of the setting lever 24, and manually released by the release lever 38, to effect exposures of one-fiftieth and one twenty-fifth of a second. Assuming that the setting lever has been adjusted for an exposure of one one-hundredth of a second or to position for an exposure of one-fiftieth or of one twenty-fifth of a second, the tripping rib and the tripping lugs, and the elements with which they coact, will assume, in the normal position of the shutter front, the relative positions shown in Fig. 13 of the drawings. If now it is desired to make the exposure automatically, thus giving the operator of the mechanism an opportunity to place himself in front of the camera either alone or in a group, the shutter front is rotated toward the right or in a clock-wise direction against the tension of its actuating spring 128 for a complete or partial revolution as is desired, as will be presently pointed out. In this movement of the shutter front, the rib 157 will ride over the lug 77 until finally its end 159 will pass the said lug. As this end of the rib passes the lug, the spring 78 will act immediately to swing the primary detent member 73 toward the right or in an anti-clockwise direction so that the shoulder 76 will then be in the path of movement of the lug 164. When the shutter front is in such position that its end 159 is slightly past the lug 77, the indicator finger 133 will be substantially in registration with the zero mark 139' upon the shutter front. Therefore having rotated the shutter front to position with the zero mark registering with the indicator finger 33, the finger release lever 38 may be depressed and released. This movement of the lever, however, will not result in a complete actuation of the master-lever for as the shoulder 76 is now in the path of movement of the lug 164 upon the said master-lever, this lug, when the master-lever is released by the finger 44 riding past its lug 46 will seat against the said shoulder 76 thus arresting the return movement of the master-lever. If now the rotation of the shutter front in a clockwise direction be continued until its revolution has been fully completed or until it has been rotated the desired distance, and the said front released, it will be backwardly rotated by its controlling spring 128 but with a retarded and timed movement so that the operator may place himself in position in front of the camera. When the front has nearly reached its normal position, the end 159 of the tripping rib 157 will engage the lug 77, and the said rib 157 will ride over this lug thereby depressing or moving the same downwardly and causing the primary master-lever detent 73 to be swung to the left thus disengaging the shoulder 76 from the lug 164 and permitting the master-lever to instantly resume its normal position under the influence of its controlling spring. In this movement of the master-lever, the shutter is, of course, opened and closed and the exposure is made.

The next longest indicated exposure period is one-half second. It is evident, however, that an exposure for this length of time cannot be made by merely tripping and then releasing the master lever as in the manner of any one of the three more rapid exposures above mentioned, for the controlling or actuating spring for the master-lever and the spring for the blade ring of the shutter will open and close the shutter blades in a shorter period of time than one-half second. The shutter mechanism of the present invention is capable of operation to effect an exposure of this length of time, and this is accomplished automatically in the following manner: The shutter front being in normal position and the setting lever having been adjusted so that its tooth 35 will seat in the notch 30 in which position of the lever the indicator finger 136 will register with the one-half second indication upon the scale plate 134, the movement of the finger release-lever 38 is blocked or prevented because of a change in position of the parts from that previously described. More specifically speaking, when the lever 24 is swung to the position stated the edge 56 of the arm 52 of the tertiary master-lever detent will rest against the cam portion 69 of the head of the said lever 24 and as the said arm moves inwardly in passing from the cam portion 7 onto the said cam portion 69, the said detent 51 will be moved under the influence of its controlling spring 64 so as to assume the position shown in Fig. 3 of the drawings, or, in other words, will be swung in an anti-clockwise direction or to the right. As the lug 63 moves in a corresponding direction, the springs 97 and 113 will, respectively, swing the detent 82 and the blocking detent 102 upon the pivot 50 so that the blocking finger 105 will be positioned directly in the path of movement of the lug 165, and manual actuation of the finger release lever is prevented. The shutter front is now turned in a clockwise direction until the zero mark of the scale upon its face registers with the indicating finger 133. As the front is thus rotated, the end 158 of the rib 157 engages the lug 109 of the blocking detent 102 and the said rib 157 rides over the beveled upper side 111 of the said lug, the lug being moved inwardly causing a corresponding tilting movement of the said detent 102 and thus moving the dog 108 out of engagement between the teeth 140 of the ratchet upon the shutter front. When the front has been turned to the zero position, the lug 77 of the primary master-lever detent 73 will be released by the rib 157, and, consequently, the said detent 73 will be swung to such position that the shoulder 76 will be in the path of movement of the lug 164 upon the master lever. Also under these conditions, the lug 109 will also be disengaged by the rib 157 and the spring which controls the blocking detent 102 will then act so as to swing this detent to the position shown in the said Fig. 3 of the drawings, in which position the dog 108 will engage between the teeth of the ratchet 140 thereby holding the said front in wound condition. When this front is released, however, the spring 128 will backwardly rotate the front and thus the teeth of the ratchet 140 will exert pressure against the dog 108 in the direction of the pivot 50 thus causing the detent 102 to move bodily toward the left in Fig. 4 against the tension of its spring 113, such movement being permitted due to the elongated nature of the opening 103 which receives the said pivot pin 50. This lateral movement of the detent 102 serves to displace the blocking finger 105 so that the finger no longer lies in the path of movement of the lug 165. The finger release-lever 38 may then be depressed and when this is done the master-lever 11 will be swung upon its pivot so that the lug 164, when the lever is released, will engage against the shoulder 76 of the primary master-lever detent 73. In this manual operation of the finger release-lever, the lug 165 will ride against the cam edge 107 of the blocking detent 102 thus swinging this detent upon its pivot 50 in a manner to move the dog 108 out of engagement with the teeth of the ratchet 140 and thus the shutter front will be released for backward rotation under the influence of its actuating spring. As the shutter front rotates backwardly the end 159 of its tripping rib 157 will engage the lug 77 of the primary detent thus swinging the detent upon its pivot so as to disengage the shoulder 76 from the lug 164 and thus the master-lever is automatically released and is swung under the influence of its spring in a direction to open the shutter. However, this movement of the master-lever is arrested when it has assumed a position in which the shutter blades will be in open position, due to the engagement of the lug 164 with the shoulder 87 of the secondary master-lever detent 82 and the parts will remain in this position, with the shutter open, until the tripping lug 163 upon the shutter front engages the pin 101 upon the link 100, as shown in Fig. 15 of the drawings. Upon such engagement of the tripping lug 163 with the said pin 101, the pin will be forced against the wall 96 of the slot 93 in the said secondary master-lever detent 82, and the detent will, therefore, be swung upon its pivot in a clockwise direction. As a result of this swinging movement of the detent the said shoulder 87 will be disengaged from the lug 164, and the master-lever will be released for complete return to normal position under the influence of its actuating spring, the shutter by reason of such movement of the master-lever being closed. The shutter front has not, however, at this time completed its anti-clockwise movement, and as it continues to rotate under the influence of its spring, the tripping lug 160 will engage the lug 109 of the blocking detent 102 in such manner as to cause this detent to move upon its pivot as shown in Fig. 13 of the drawings, thereby disengaging the said lug from the shoulder 156 upon which it had previously been seated. In this manner the blocking detent 102 will be so swung that its dog 108 will be moved into engagement between the teeth of the ratchet 140 and the blocking finger 105 will be returned to position in the path of movement of the lug 165 so as to prevent actuation of the finger release-lever 38 until the shutter front is again set or until the setting lever has been moved to some other position of adjustment which does not require blocking of the said lever 38.

In order to effect an exposure of one second, the setting lever 24 is swung to such position that its tooth 35 will engage in the notch 31, and the foregoing operation, comprehending rotation of the shutter front to zero position, actuation of the finger release lever 38, and then complete setting of the shutter front, is then repeated. In so adjusting the setting lever to its new position, however, the stud 101 will be moved in the slots 93 and 152 to the lower dotted line position shown in Fig. 15, in which position it will be in the path of movement of the tripping lug 162. However, the rotation of the shutter front is so timed, and the said lug 162 is so positioned with relation to the lug 163, that the stud 101 will be engaged one-half second later than it would have been had it been in position for engagement by the lug 163 as in the previously described operation. In other words, whereas before, a period of one-half second elapsed between the engagement of the tripping rib 157 with the lug 77 to trip the primary master-lever detent, and the engagement of the lug 163 with the pin 101 to trip the secondary master-lever detent, in this latter operation, a period of one second elapses between the engagement of the said tripping rib 157 with the said lug 77 and the engagement of the lug 162 with the said pin 101.

The same operation takes place in effecting an exposure of three seconds except that when the setting lever is adjusted so that its tooth 35 will seat in the notch 32, the pin 101 will be in the upper dotted line position shown in Fig. 15 and will, therefore, be engaged by the tripping lug 161 instead of by the lug 162 as in the last described operation.

If the operator of the mechanism so desires, he may rotate the shutter front through a complete revolution in which event a maximum length of time will elapse between the moment of releasing the shutter front for backward rotation under the influence of its spring, and the moment when the mechanism acts automatically to open the shutter, but by providing the scale 139 upon the face of the shutter front and having determined the speed at which the front is rotated by its controlling spring, the operator is enabled to shorten this period of time to practically any desired extent. Thus if he is satisfied that only five seconds shall elapse between release of the shutter front and the opening of the shutter, he need only rotate the shutter front to such position that the indicator finger 133 will register with the mark of the scale 139 which is indicated to denote five seconds, and so with the other indicated marks constituting the said scale.

The presence of the mechanism for effecting automatic operation of the shutter, does not in any way interfere with the making of bulb and timed exposures. In order to make a bulb exposure, it is only necessary to swing the setting lever 24 so that its finger 136 will point to the proper indication upon the scale plate 134, in which position the tooth 35 of the lever will seat in the notch 33. When the lever is so adjusted, the cam 116 will be brought into engagement with the rounded corner or shoulder 114 of the blocking detent 102 and this detent will in this manner be caused to move upon its pivot, thus moving its blocking finger 105 out of the path of movement of the lug 165 of the finger release lever so as to not block the movement of this lever when the lever is depressed or when the bulb itself is made use of for the purpose of actuating the lever. With the setting lever in the position stated, the edge 56 of the arm 52 of the tertiary master-lever detent 51 will rest against the cam portion 69 of the setting lever 24, and in this position of the tertiary master-lever detent 51, the secondary master-lever detent 82 will assume, under the influence of its spring, a position such that the shoulder 87 will be in the path of movement of the lug 164. The shoulder 76 of the primary detent 73, however, will be out of the path of movement of the lug 164 due to the engagement of the rib 157 over the lug 77. Thus when the finger release-lever is actuated either directly or through the bulb, the master-lever will be swung upon its pivot until tripped, whereupon the lug 164 will engage the shoulder 87 of the detent 82 and the shutter will remain open until the finger release lever is relieved of pressure. When the finger release lever is permitted to return to its normal position, the lug 165 will ride against the cam portion 89 of the wall of the opening 88 thus rocking the detent 82 upon its pivot so as to disengage the shoulder 87 from the lug 164 thus permitting the master-lever to return completely to normal position and close the shutter.

In order to effect a timed exposure, the setting lever 24 is swung to the position shown in Fig. 16 of the drawings, or, in other words, with its tooth 35 seating in the notch 34. With the lever in this position, the edge 56 of the arm 52 of the detent 51 will engage the cam portion 68 of the said setting lever thus permitting movement of the said detent 51 upon its pivot and through the action of its controlling spring, to such position that the shoulder 59 will be in the path of movement of the lug 164. The cam 116 will in this position of the parts engage the rounded corner 114 of the detent 102 in such a manner as to swing the detent upon its pivot to position the blocking finger 105 out of the path of movement of the lug 165. Now when the finger release-lever is actuated, the master-lever will be tripped and its lug 164 will come to rest against the shoulder 87 of the detent 82 and the shutter will remain open. Upon return of the release-lever to its normal position, the lug 165 will act against the cam edge 89 rocking the detent 82 upon its pivot so as to disengage the shoulder 87 from the lug 164. However, the shoulder 59 of the detent 51 is, in this position of the detent, in the path of movement of the lug 164, being in fact in a position immediately below the position occupied by the shoulder 87 when the latter shoulder is effected. Therefore the master-lever will not be released for completion of its movement to normal position in a manner which would effect the closing of the shutter, but the shutter will still remain open. Also in this position of the detent 51, the shoulder 62 will be in the path of movement of the lug 165 and therefore the release lever 38 cannot be so actuated as to cause a second tripping of the master-lever. Now if the release-lever is again actuated the lug 165 will ride against the adjacent edge of the finger 60 of the said detent 51 in a manner to cause the detent to swing upon its pivot to disengage the shoulder 59 from the lug 154, thus permitting the master-lever to fully return to normal position thereby closing the shutter. Upon releasing the finger release lever for return to its normal position, the lug 165, moving downwardly in the opening 88, will permit the detent 51 to assume such a position that the outer end of its lug 58 will engage against the side of the lug 164 upon the master-lever thereby holding the said detent 51 in such position that its shoulder 62 will be out of the path of movement of the said lug 165 whereupon the lug may pass to the extreme lower end of the opening 88 and the release may completely resume its normal position.

It will be recalled that backward rotation of the shutter front, in the automatic operation of the mechanism, is prevented by engagement of the dog 108 with the teeth of the ratchet 140, until the finger release-lever is actuated so as to release the front for actuation by its spring. However, after having set the lever 24 for a certain definite exposure and having rotated the shutter front to set position, the operator might change his mind as to the length of the exposure or decide to not make the exposure at all. In order that the shutter front may be restored to its normal position without, however, causing automatic actuation of the shutter, it is only necessary to swing the setting lever 24 to position for a time exposure whereupon the cam 116 will engage the rounded corner 114 of the blocking detent 102 thus moving the said detent upon its pivot so as to move the dog 108 out of engagement with the teeth of the ratchet 140 and thereby releasing the shutter front for its return to normal position through the influence of its spring.

Having thus described the invention, what is claimed as new is:

1. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping the master-lever, means for holding the master-lever in tripped position, means for arresting the master-lever in its release movement in a position to maintain the shutter in open position, and means actuated by the automatic movement of the trip member to successively render the two last mentioned means inactive.

2. In camera shutter operating mechanism, the combination with a master-lever, a shutter, and operating means between the said lever and shutter for actuating the shutter to open and close the same when the master-lever is tripped and then released, of a trip member manually movable in one direction, means for automatically moving the said member in the opposite direction when manually moved and released, means for tripping the master-lever, means for holding the master-lever in tripped position, means for arresting the master lever in its release movement in a position to maintain the shutter in open position, and means actuated by the automatic movement of the trip member and acting at spaced periods of time to successively render the two last-mentioned means inactive.

3. In camera shutter operating mechanism, the combination with a master-lever, a shutter, and operating means between the said lever and shutter for actuating the shutter to open and close the same when the master-lever is tripped and then released, of a trip member manually movable in one direction, means for automatically moving the said member in the opposite direction when manually moved and released, means for tripping the master-lever, means for holding the master-lever in tripped position, means for arresting the master-lever in its release movement in a position to maintain the shutter in open position, means actuated by the automatic movement of the trip member and acting at spaced periods of time to successively render the two last-mentioned means inactive, and means adjustable to vary the interval of time between the periods of actuation of the said two last mentioned means.

4. In camera shutter operating mechanism, the combination with a master-lever, a shutter, and operating means between the said lever and shutter for actuating the shutter to open and close the same when the master-lever is tripped and then released, of a trip member manually movable in one direction, means for automatically moving the said member in the opposite direction when manually moved and released, manually operable means for tripping the master-lever, means acting automatically to hold the master-lever in tripped position when released by the manually operable tripping means, means actuated by the automatic movement of the trip member for rendering the last mentioned means inactive, means for arresting the master lever in its release movement in position to maintain the shutter in open position, and means actuated by the automatic movement of the trip member to render the last mentioned means inactive.

5. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction when manually moved and released, means operable to manually trip and release the master lever, spaced detent elements in the path of movement of the master lever when released, and means actuated by the automatic movement of the trip member to successively render the detent elements inactive.

6. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the said master-lever, and means rendered active and inactive through the automatic movement of the trip member to successively arrest the release movement of the master-lever whereby to first hold the same in position with the shutter closed, and to subsequently hold the same in position with the shutter open.

7. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the master lever, primary and secondary detents in the path of movement of the master-lever when released and arranged respectively to arrest the lever in tripped position and in position to maintain the shutter open, and means actuated by the automatic movement of the trip member to successively render the said primary and secondary detents inactive.

8. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the master-lever, primary and secondary detents in the path of movement of the master-lever when released and arranged respectively to arrest the movement of the lever in tripped position and in position with the shutter open, means actuated through automatic movement of the trip member to successively render the said detents inactive, and means whereby the interval between the periods of actuation of the primary and secondary detents may be varied.

9. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the trip member in the opposite direction when manually moved and released, means for tripping and releasing the master-lever, primary and secondary detents in the path of movement of the master-lever when released and arranged respectively to arrest the lever in tripped position and in position to maintain the shutter open, an element associated with the secondary detent and adjustable with relation thereto, means upon the trip member arranged in the automatic movement of the said member to render the primary detent inactive, and means carried by the said trip member and arranged in the said automatic movement of the trip member to coact with the said element associated therewith in any of its positions of adjustment.

10. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the trip member in the opposite direction when manually moved and released, means for tripping and releasing the master-lever, primary and secondary detents in the path of movement of the master-lever when released and arranged respectively to arrest the lever in tripped position and in position to maintain the shutter open, an element associated with the secondary detent and adjustable with relation thereto, means upon the trip member arranged in the automatic movement of the said member to render the primary detent inactive, and means carried by the said trip member and arranged in the said automatic movement of the trip member to coact with the said element associated therewith in any of its positions of adjustment, the said means upon the trip member for coaction with the said element associated with the secondary detent comprising abutments relatively spaced in the direction of automatic movement of the trip member.

11. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the master lever, primary and secondary detents in the path of movement of the master lever when released and arranged respectively to arrest the movement of the master lever in tripped position and in position to maintain the shutter open, an abutment upon the trip member for coaction with the primary detent in the automatic movement of the said trip member to render the said primary detent inactive, other abutments upon the said trip member spaced with relation to each other in the direction of movement of the said member, and relatively offset transversely to such direction, and an element associated with the secondary detent and adjustable across the path of movement of the last mentioned abutments.

12. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the master-lever, means for holding the master-lever in tripped position, means for arresting the master-lever in its release movement in a position to maintain the shutter in open position, means actuated by the automatic movement of the trip member to successively render the two last mentioned means inactive, and manually adjustable means for selectively rendering the master lever arresting means active and inactive.

13. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the master lever, primary and secondary detents arranged respectively to arrest the release movement of the master lever in tripped position with the shutter closed and in position with the shutter open, means actuated by the automatic movement of the trip member to successively render the primary and secondary detents inactive, and manually adjustable means for selectively rendering the secondary detent active and inactive.

14. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the master-lever, primary and secondary detents arranged respectively to arrest the master-lever in its release movement in tripped position with the shutter closed and in position with the shutter open, and means actuated by the automatic movement of the trip member to successively render the said detents inactive and to normally render the primary detent inactive.

15. In camera shutter operating mechanism, the combination with a master-lever, a normally tensioned spring for actuating the same, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the master-lever, a primary detent for arresting the master-lever in its release movement in tripped position with the shutter closed, a secondary detent for arresting the master-lever in its release movement in a position to maintain the shutter in open position, means actuated by the automatic movement of the trip member to successively render the detents inactive, and means manually adjustable for selectively rendering the secondary detent active and inactive, and when adjusted to render the said secondary detent inactive, coacting with the master-lever spring to vary the tension thereof.

16. In camera shutter operating mechanism, the combination with a master-lever, a normally tensioned spring for actuating the same, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the master-lever, a primary detent for arresting the master-lever in its release movement in tripped position with the shutter closed, a secondary detent for arresting the master-lever in its release movement in a position to maintain the shutter in open position, means actuated by the automatic movement of the trip member to successively render the detents inactive, a manually adjustable member, operative connection between the same and the secondary detent to render the same detent inactive when the member is subjected to one adjustment, and means carried by the member and coacting with the master-lever spring in such adjustment of the said member whereby to increase the tension of said spring.

17. In camera shutter operating mechanism, the combination with a master-lever, a normally tensioned spring for actuating the same, a shutter, and operative means between the said lever and shutter for actuating the shutter to open and close the same when the master lever is tripped and then released, of a trip member manually movable in one direction, means for automatically moving the said member in the opposite direction when manually moved and released, means for tripping and releasing the master-lever, a primary detent for arresting the master-lever in its release movement in tripped position with the shutter closed, a secondary detent for arresting the master-lever in its release movement in a position to maintain the shutter in open position, means actuated by the automatic movement of the trip member to successively render the detents inactive, a manually adjustable member for controlling the exposure intervals and arranged when adjusted to one position to render the secondary detent inactive, and means controlled by the movement of said member to said position of adjustment for coaction with the master-lever spring to increase the tension thereof.

18. In camera shutter operating mechanism, the combination with a master-lever, a normally tensioned spring for actuating the same, a shutter, and operative means between the said lever and shutter for actuating the shutter to open and close the same when the master-lever is tripped and then released, of a trip member manually movable in one direction, means for automatically moving the said member in the opposite direction when manually moved and released, means for tripping and releasing the master-lever, a primary detent for arresting the master-lever in its release movement in tripped position with the shutter closed, a secondary detent for arresting the master-lever in its release movement in a position to maintain the shutter in open position, means actuated by the automatic movement of the trip member to successively render the detents inactive, a manually adjustable member for controlling the exposure intervals and arranged when adjusted to any one of a plurality of positions to render the secondary detent inactive, and means carried by the said member for coaction with the master-lever spring to successively vary the tension thereon as the said member is successively moved to the said positions of adjustment.

19. In camera shutter operating mechanism, in combination, a master-lever, a normally tensioned spring for actuating said lever, a shutter, a blade ring, a spring for actuating the blade ring connected therewith and tensioned by engagement with the master-lever spring, operative means between the said lever and shutter for actuating the shutter to open and close the same when the master-lever is tripped and then released, means for tripping and releasing the master-lever, and means for varying the tension of the master-lever spring and thereby varying the tension of the blade ring spring.

20. In camera shutter operating mechanism, in combination, a master-lever, a normally tensioned spring for actuating said lever, a shutter, a blade ring, a spring for actuating the blade ring connected therewith and tensioned by engagement with the master-lever spring, operative means between the said lever and shutter for actuating the shutter to open and close the same when the master-lever is tripped and then released, means for tripping and releasing the master-lever, and an adjustable member having an element for coaction with the master-lever spring whereby when the member is given a predetermined adjustment, the tension upon the master-lever spring will be increased and thereby increase the tension upon the blade ring spring.

21. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction, blocking means for holding the said member against movement in the last mentioned direction, a single means operable to trip the master-lever and release the same and to render the blocking means inactive, means for arresting the master-lever in its release movement in position to maintain the shutter closed, and means actuated through automatic movement of the trip member to render the master-lever arresting means inactive.

22. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction, blocking means for holding the said member against movement in the last-mentioned direction, a single means operable to trip the master-lever and release the same and to render the blocking means inactive, means for arresting the master-lever in its release movement in position to maintain the shutter closed, means for subsequently arresting the master-lever in its release movement in position to maintain the shutter open, and means actuated through automatic movement of the trip member to successively render the said master-lever arresting means inactive.

23. In camera shutter operating mechanism, the combination with a master-lever, a shutter, and operative means between the said lever and shutter for actuating the shutter to open and close the same when the master-lever is tripped and then released, of a rotatable trip member manually movable in one direction, means for automatically moving the said member in the opposite direction, a ratchet carried by the said member, escapement mechanism coacting with the ratchet to retard and time the automatic rotation of the said trip member, a blocking detent having an element for coaction with the teeth of the ratchet to hold the tripping member against movement in such direction, means operable to trip the master-lever and release the same and to actuate the blocking detent to disengage its said element from the teeth of the said ratchet whereby to release the tripping member for automatic rotation, means for arresting the master-lever in its release movement in position to maintain the shutter closed, and means actuated through the automatic rotation of the trip member to render the master-lever arresting means inactive.

24. In camera shutter operating mechanism, in combination, a shutter, a master-lever, means operating between the said lever and shutter for actuating the shutter to open and close the same when the lever is tripped and released, manually operable means for actuating the master-lever, automatic means for actuating the said lever and adjustable to selectively effect an exposure of a predetermined interval or an exposure of a greater interval, and means controlled through adjustment of the said automatic actuating means for blocking movement of the manually operable means for actuating the master-lever when the said automatic actuating means is set for the last-mentioned exposure interval.

25. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction, a release lever operable to trip and release the master lever, means for automatically arresting the master-lever in its release movement in position to maintain the shutter closed, means actuated through automatic movement of the trip member to render the arresting means inactive whereby to permit further release movement of the said master-lever to cause actuation of the shutter to effect an "instantaneous" exposure, means adjustable to position to arrest the master-lever in its said further release movement in position to maintain the shutter open, means actuated through automatic movement of the trip member to render the last-mentioned arresting means inactive subsequent to the rendering inactive of the first mentioned arresting means, means for effecting adjustment of the second mentioned arresting means, and means controlled through the actuation of the last-mentioned means for blocking the movement of the release lever when the said second-mentioned arresting means is in active position.

26. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction, a release lever operable to trip and release the master-lever, a primary detent for automatically arresting the master-lever in its release movement in position to maintain the shutter closed, means actuated through automatic movement of the trip member to render the said detent inactive whereby to permit further release movement of the said master-lever to cause actuation of the shutter, a secondary detent arranged when in one position to arrest the master-lever in its further release movement in position to maintain the shutter open, a setting lever having operative connection with the secondary detent to provide for adjustment of the secondary detent into and out of active position, means actuated through automatic movement of the trip member to render the secondary detent inactive subsequent to the rendering inactive of the first mentioned detent, and means controlled through the adjustment of the setting-lever for blocking the movement of the release-lever when the setting-lever is adjusted to position to render the secondary detent active.

27. In camera shutter operating mechanism, the combination with a master-lever, a shutter, and operative means between the said lever and shutter for actuating the shutter to open and close the same when the master-lever is tripped and then released, of a trip member manually movable in one direction, means for automatically moving the said member in the opposite direction, a release lever operable to trip and release the master-lever, a primary detent for automatically arresting the master-lever in its release movement in position to maintain the shutter closed, means actuated through automatic movement of the trip member to render the said detent inactive whereby to permit further release movement of the said master-lever to cause actuation of the shutter, a secondary detent arranged when in one position to arrest the master-lever in its further release movement in position to maintain the shutter open, a setting lever having operative connection with the secondary detent to provide for adjustment of the secondary detent into and out of active position, means actuated through automatic movement of the trip member to render the secondary detent inactive subsequent to the rendering inactive of the first mentioned detent, a blocking detent, means tending to move the detent to position blocking movement of the release lever, and means operating between the blocking detent and the setting lever for permitting movement of the detent to blocking position when the lever is set for the last mentioned exposure interval, and effecting movement of the blocking detent out of blocking position when the said setting lever is set for the first mentioned exposure interval.

28. In camera shutter operating mechanism, in combination, a shutter, a master-lever, means between the said lever and shutter for actuating the shutter to open and close the same when the master-lever is tripped and released, manually operable means for actuating the master-lever, automeans for actuating the said lever and matic means for actuating the said lever and adjustable to selectively effect an exposure of a predetermined interval or an exposure of a greater interval, and means controlled through the adjustment of the said automatic actuating means for blocking movement of the manually operable means for actuating the master-lever when the said automatic actuating means is in a state of rest and is set for the last mentioned exposure interval.

29. In camera shutter operating mechanism, in combination, a shutter, a master-lever, means between the said lever and shutter for actuating the shutter to open and close the same when the master-lever is tripped and released, manually operable means for actuating the master-lever, automatic means for actuating the said lever and adjustable to selectively effect an exposure of a predetermined interval or an exposure of a greater interval, and means controlled through the adjustment of the said automatic actuating means for blocking movement of the manually operable means for actuating the master-lever when the said automatic actuating means is in a state of rest and is set for the last mentioned exposure interval, said means controlled through adjustment of the automatic actuating means being arranged to render the blocking means inactive when the said automatic actuating means is set for an exposure of the said predetermined interval or less.

30. In camera shutter operating mechanism, in combination, a shutter, a master-lever, means operating between the said shutter and master-lever for actuating the shutter to open and close the same when the master-lever is tripped and released, a release-lever, coacting elements upon the master and release-levers for tripping and releasing the master-lever when the release-lever is actuated, a detent having a shoulder in the path of movement of an element of the master-lever whereby to arrest the master-lever in its release movement in position to maintain the shutter open, the detent having a cam portion and the release lever having a lug arranged to ride against the said cam portion whereby to move the detent to inactive position when the release-lever has been initially actuated and is released, a second detent having a detent shoulder in the path of movement of the said element of the master-lever to be engaged by said element subsequent to release of the element by the first-mentioned detent, the last-mentioned detent also having a cam portion to be engaged by the lug of the release-lever to cause movement of the said last mentioned detent to inactive position when the release lever is actuated.

31. In camera shutter operating mechanism, in combination, a shutter, a master-lever, means operating between the said shutter and master-lever for actuating the shutter to open and close the same when the master-lever is tripped and released, a release-lever, coacting elements upon the master and release-levers for tripping and releasing the master-lever when the release-lever is actuated, a detent having a shoulder in the path of movement of an element of the master-lever whereby to arrest the master-lever in its release movement in position to maintain the shutter open, the detent having a cam portion and the release lever having a lug arranged to ride against the said cam portion whereby to move the detent to inactive position when the release-lever has been initially actuated and is released, a second detent having a detent shoulder in the path of movement of the said element of the master-lever to be engaged by said element subsequent to release of the element by the first-mentioned detent, the last-mentioned detent also having a cam portion to be engaged by the lug of the release-lever to cause movement of the said last mentioned detent to inactive position when the release lever is actuated, the last-mentioned detent having a shoulder in the path of movement of the lug upon the release-lever to be engaged by the said lug whereby to arrest the release-lever in its return movement after actuation and release, and the said last-mentioned detent being further provided with a portion to engage against the said element of the master-lever when the master-lever is in normal position, whereby in said position of the master-lever the said last-mentioned detent will be held in inactive position.

32. In camera shutter operating mechanism, the combination with a master-lever, a shutter, and operative means between the said lever and shutter for actuating the shutter to open and close the same when the master-lever is tripped and then released, of a trip member manually movable in one direction, means for moving the trip member in the opposite direction, a primary detent arranged in the path of release movement of the master-lever whereby to arrest the said lever in its said movement in position with the shutter closed, a secondary detent arranged in the path of release movement of the master-lever whereby to arrest said lever in position with the shutter open, means controlled through the automatic movement of the tripping member for automatically successively tripping the primary and secondary detents to move the same to inactive position, a setting lever provided with relatively stepped cam portions, and means arranged to be acted upon by the said cam portions in the adjustment of the setting lever and having operative connection with the said secondary detent whereby to provide for movement of the secondary detent into and out of active position through adjustment of the said setting lever.

33. In camera shutter operating mechanism, in combination, a shutter, a master-lever, means operating between the shutter and master-lever for opening and closing the shutter when the master-lever is stepped and released, the master-lever having a lug, a primary detent having a shoulder normally in the path of movement of the master-lever lug, a secondary detent having a shoulder normally in the path of movement of the said master-lever lug, a setting lever, a stud carried by the setting lever and projecting into a slot formed in the secondary detent, a trip member manually movable in one direction and automatically moved in the opposite direction, and abutment elements upon the trip member arranged to coact with the said stud and with the lug upon the primary detent.

34. In camera shutter operating mechanism, in combination, a shutter, a master-lever, means operating between the shutter and master-lever for opening and closing the shutter when the master-lever is stepped and released, the master-lever having a lug, a primary detent having a shoulder normally in the path of movement of the master-lever lug, a secondary detent having a shoulder normally in the path of movement of the said master-lever lug, a setting lever, a stud carried by the setting lever and projecting into a slot formed in the secondary detent, a trip member manually movable in one direction and automatically moved in the opposite direction, abutment elements upon the trip member arranged to coact with the said stud and with the lug upon the primary detent, a ratchet upon the trip member, an escapement pawl for coaction with the ratchet whereby to time the automatic movement of the trip member, a blocking detent having a tooth for coaction with the ratchet whereby to hold the trip member against automatic movement, and means carried by the trip member for coaction with the said detent to render the same inactive.

35. In camera shutter operating mechanism, in combination, a shutter, a master-lever, means operating between the shutter and master-lever for opening and closing the shutter when the master-lever is stepped and released, the master-lever having a lug, a primary detent having a shoulder normally in the path of movement of the master-lever lug, a secondary detent having a shoulder normally in the path of movement of the said master-lever lug, a setting lever, a stud carried by the setting lever and projecting into a slot formed in the secondary detent, a trip member manually movable in one direction and automatically moved in the opposite direction, abutment elements upon the trip member arranged to coact with the said stud and with the lug upon the primary detent, a ratchet upon the trip member, an escapement pawl for coaction with the ratchet whereby to time the automatic movement of the trip member, a blocking detent having a tooth for coaction with the ratchet whereby to hold the trip member against automatic movement, means carried by the trip member for coaction with the said detent to render the same inactive, a release-lever for actuating the master-lever, and means carried by the release-lever for coaction with the said blocking detent to render the same inactive when the lever is actuated to trip the master-lever.

36. In camera shutter operating mechanism, in combination, a shutter, a master-lever, means operating between the shutter and master-lever for opening and closing the shutter when the master-lever is stepped and released, the master-lever having a lug, a primary detent having a shoulder normally in the path of movement of the master-lever lug, a secondary detent having a shoulder normally in the path of movement of the said master-lever lug, a setting lever, a stud carried by the setting lever and projecting into a slot formed in the secondary detent, a trip member manually movable in one direction and automatically moved in the opposite direction, abutment elements upon the trip member arranged to coact with the said stud and with the lug upon the primary detent, a ratchet upon the trip member, an escapement pawl for coaction with the ratchet whereby to time the automatic movement of the trip member, a blocking detent having a tooth for coaction with the ratchet whereby to hold the trip member against automatic movement, means carried by the trip member for coaction with the said detent to render the same inactive, a release-lever for actuating the master-lever, and means carried by the release-lever for coaction with the said blocking detent to render the same inactive when the lever is actuated to trip the master-lever, the said blocking detent having a blocking finger for coaction with the said means upon the release-lever to block movement of the said release-lever.

37. In camera shutter operating mechanism, the combination with a shutter, a master-lever, means operating between the shutter and master-lever for actuating the shutter to open and close the same when the master-lever is tripped and released, of a rotatable trip member, means actuated through rotation of the trip member to actuate the master-lever, a ratchet upon the trip member, a floating escapement pawl for the ratchet, a dash-pot cylinder, an arm upon one end of which the pawl is rigidly secured, and a piston connected with the other end of the arm and working in the dash-pot cylinder.

In testimony whereof I affix my signature.

JOHN H. KLENCK. [L. S.]